United States Patent
Zhang et al.

(10) Patent No.: US 10,648,346 B2
(45) Date of Patent: May 12, 2020

(54) SHROUD CONFIGURATIONS FOR TURBINE ROTOR BLADES

(71) Applicant: General Electric Company, Schenectady, NY (US)

(72) Inventors: Xiuzhang James Zhang, Simpsonville, SC (US); Kevin Richard Kirtley, Simpsonville, SC (US); Lisa DeBellis, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1032 days.

(21) Appl. No.: 15/203,027

(22) Filed: Jul. 6, 2016

(65) Prior Publication Data

US 2018/0010467 A1    Jan. 11, 2018

(51) Int. Cl.
 *F01D 5/20* (2006.01)
 *F01D 5/22* (2006.01)
 *F01D 11/08* (2006.01)

(52) U.S. Cl.
 CPC ............... *F01D 5/225* (2013.01); *F01D 5/20* (2013.01); *F01D 11/08* (2013.01); *F05D 2220/32* (2013.01); *F05D 2240/24* (2013.01); *F05D 2240/307* (2013.01); *F05D 2240/55* (2013.01); *Y02T 50/671* (2013.01); *Y02T 50/673* (2013.01)

(58) Field of Classification Search
 CPC .............. F01D 5/225; F01D 5/20; F01D 11/08
 See application file for complete search history.

(56) References Cited

U.S. PATENT DOCUMENTS

| 2,278,041 | A | * | 3/1942 | Allen | ...................... F01D 5/225 416/191 |
| 5,997,251 | A | * | 12/1999 | Lee | ......................... F01D 5/187 416/97 R |
| 6,241,471 | B1 |  | 6/2001 | Herron | |
| 6,672,829 | B1 | * | 1/2004 | Cherry | .................... F01D 5/141 415/115 |
| 6,805,530 | B1 | * | 10/2004 | Urban | ..................... F01D 5/225 415/173.4 |
| 6,913,445 | B1 |  | 7/2005 | Beddard et al. | |
| 7,001,144 | B2 |  | 2/2006 | Urban et al. | |
| 7,066,713 | B2 | * | 6/2006 | Dube | ..................... F01D 5/143 415/173.5 |

(Continued)

FOREIGN PATENT DOCUMENTS

EP    2578806 A2    4/2013

*Primary Examiner* — Woody A Lee, Jr.
(74) *Attorney, Agent, or Firm* — Charlotte C. Wilson; James W. Pemrick

(57) ABSTRACT

A turbine rotor blade that includes a tip shroud attached to the outboard tip of the airfoil. The tip shroud may include an axially and circumferentially extending planar component in which an inboard surface opposes an outboard surface, and a shroud edge that connects the inboard surface to the outboard surface and defines an outboard profile of the tip shroud. The tip shroud may include a seal rail protruding from the outboard surface of the tip shroud and a cutter tooth disposed on the seal rail. The cutter tooth may be formed as a circumferential section of the seal rail that is axially thickened. The seal rail may further include a leakage gap formed therethrough that is configured to increase a leakage level during operation.

14 Claims, 12 Drawing Sheets

(56) References Cited

U.S. PATENT DOCUMENTS

| | | | |
|---|---|---|---|
| 7,066,714 B2* | 6/2006 | Miller | F01D 5/225 |
| | | | 415/173.6 |
| 7,255,531 B2 | 8/2007 | Ingistov | |
| 7,527,477 B2* | 5/2009 | Norton | F01D 5/225 |
| | | | 29/889.2 |
| 7,628,587 B2 | 12/2009 | McFeat et al. | |
| 7,762,779 B2 | 7/2010 | Zemitis et al. | |
| 8,043,061 B2 | 10/2011 | Chiurato et al. | |
| 8,192,166 B2 | 6/2012 | Beeck et al. | |
| 8,371,816 B2* | 2/2013 | Piersall | F01D 5/16 |
| | | | 416/190 |
| 8,444,371 B2 | 5/2013 | John et al. | |
| 9,163,519 B2* | 10/2015 | Kleinow | F01D 5/225 |
| 9,551,226 B2* | 1/2017 | Smith | F01D 5/143 |
| 2008/0038116 A1* | 2/2008 | Zemitis | F01D 5/225 |
| | | | 416/191 |
| 2009/0053047 A1* | 2/2009 | Chiurato | F01D 5/225 |
| | | | 415/173.1 |
| 2013/0189106 A1* | 7/2013 | Chouhan | F01D 5/225 |
| | | | 416/179 |
| 2013/0209258 A1* | 8/2013 | Ghate | F01D 5/225 |
| | | | 416/191 |
| 2016/0108749 A1* | 4/2016 | Evans | F01D 5/225 |
| | | | 416/191 |
| 2017/0175535 A1* | 6/2017 | Chouhan | F01D 5/18 |
| 2017/0298744 A1* | 10/2017 | Zhang | F01D 5/187 |
| 2018/0230816 A1* | 8/2018 | Zemitis | F01D 5/20 |

* cited by examiner

SHROUD CONFIGURATIONS FOR TURBINE ROTOR BLADES

BACKGROUND OF THE INVENTION

This present application relates to tip shroud configurations for rotor blades in gas turbine engines. More specifically, but not by way of limitation, the present application relates to the design and configuration of seal rails on rotor blade tip shrouds.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, for example, rotate the coils of a generator so to generate electrical power. During operation, because of the temperatures of the hot-gas path, the velocity of the working fluid, and the rotational velocity of the engine, the rotor blades within the turbine become particularly stressed with extreme mechanical and thermal loads.

Many industrial applications, such as those involving power generation and aviation, still rely heavily on gas turbines, and because of this, the engineering of more efficient engines remains an ongoing and important objective. As will be appreciated, even incremental advances in machine performance, efficiency, or cost-effectiveness are meaningful in the highly competitive markets that have evolved around this technology. While there are several known strategies for improving the efficiency of gas turbines, such as, for example, increasing the size of the engine, firing temperatures, or rotational velocities, each of these generally places additional strain on those already highly stressed hot-gas path components. As a result, there remains a need for improved apparatus, methods or systems that alleviate such operational stresses or, alternatively, that enhance the durability of such components so they may better withstand them.

As will be appreciated, this need is particularly evident in regard to turbine rotor blades, where marketplace competitiveness is exceedingly high and the many design considerations are highly complex and often competing. As such, novel rotor blade designs, such as those presented herein, that succeed in balancing these considerations in ways that optimize or enhance one or more desired performance criteria—while still adequately promoting structural robustness, part-life longevity, cost-effective engine operation, and/or the efficient usage of coolant—represent technological advances having considerable value.

BRIEF DESCRIPTION OF THE INVENTION

The present application thus describes a turbine rotor blade that includes a tip shroud attached to the outboard tip of the airfoil. The tip shroud may include an axially and circumferentially extending planar component in which an inboard surface opposes an outboard surface, and a shroud edge that connects the inboard surface to the outboard surface and defines an outboard profile of the tip shroud. The tip shroud may include a seal rail protruding from the outboard surface of the tip shroud and a cutter tooth disposed on the seal rail. The cutter tooth may be formed as a circumferential section of the seal rail that is axially thickened. The seal rail may further include a leakage gap formed therethrough that is configured to increase a leakage level during operation so as to provide an aero-thermal benefit.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
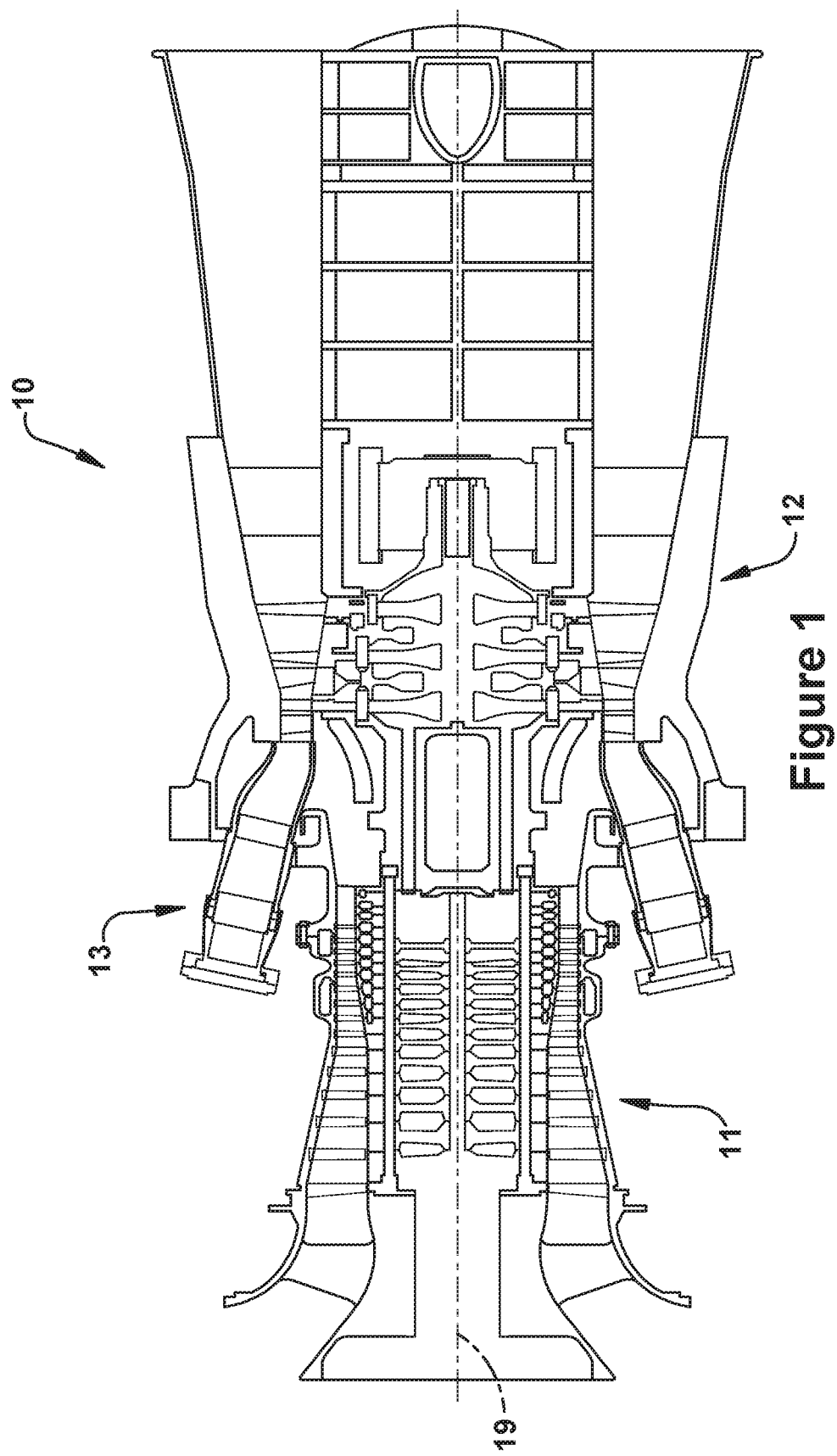
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. As will be understood, these terms may be used both in describing or claiming the gas turbine or one of the subsystems thereof—e.g., the compressor, combustor, or turbine—as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face that faces toward the forward direction as defined by the orientation of the gas turbine (i.e., the compressor being designated as the forward end and turbine being designated as the aftward end). To take a major subsystem like the turbine as another example (and assuming a typical gas turbine arrangement such as the one shown in FIG. 1), the forward and aftward directions may be defined relative to a forward end of the turbine, at where a working fluid enters the turbine, and an aftward end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as referring to the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Thus, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
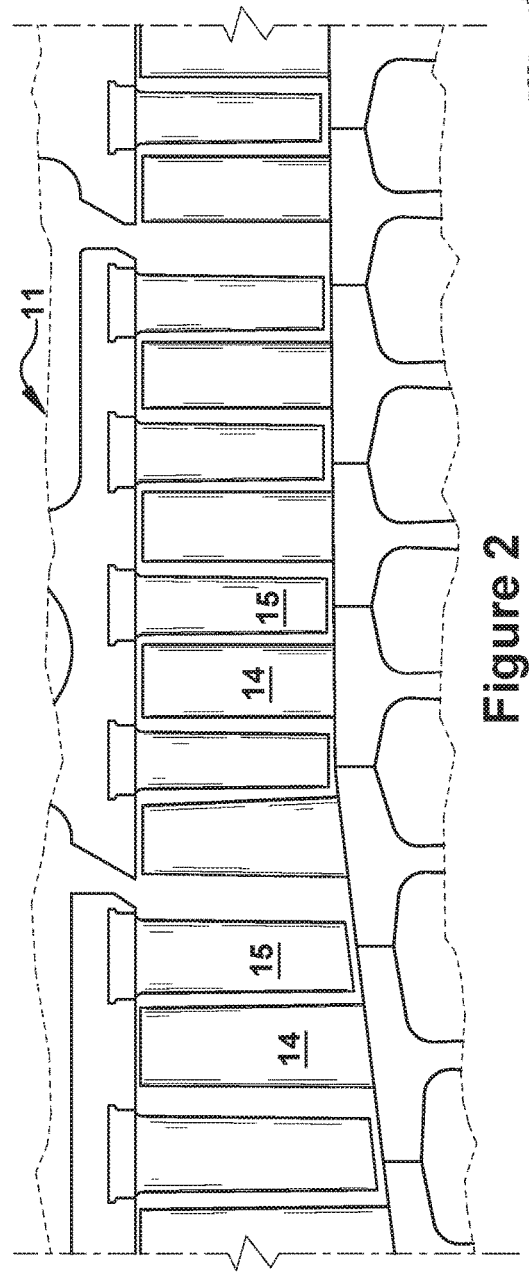
FIG. 2 is a sectional view of the compressor section of the gas turbine of FIG. 1.
Figure 3:
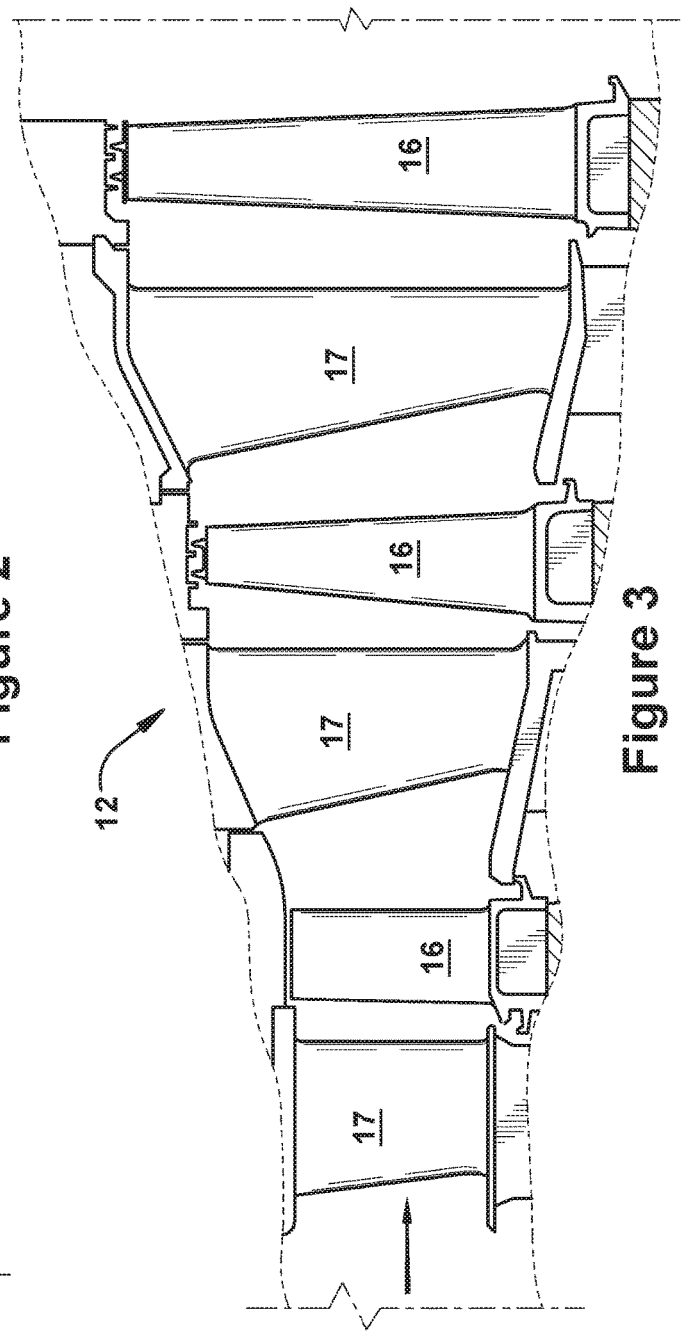
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

For background purposes, FIG. 4 through 8 provides views of conventional shrouded turbine rotor blades 16. As will be appreciated, these figures are provided to illustrate common configurations of such rotor blades and delineate spatial relationships between components and regions within such blades for later reference, while also describing geometric constraints and other criteria that affect the internal and external design thereof. While the blade of this example is a rotor blade, it will be appreciated that, unless otherwise stated, the present invention also may be applied to other types of blades within the gas turbine. As stated above, description of such components may include terminology that derives meaning based on the orientation and function of the gas turbine engine and, more specifically, the working fluid flowpath, and, thus, should be understood in that context. For example, where applicable, description related to the rotor blade or other component may assume that it is properly installed and operating under anticipated or normal conditions within the engine.

Figure 4:
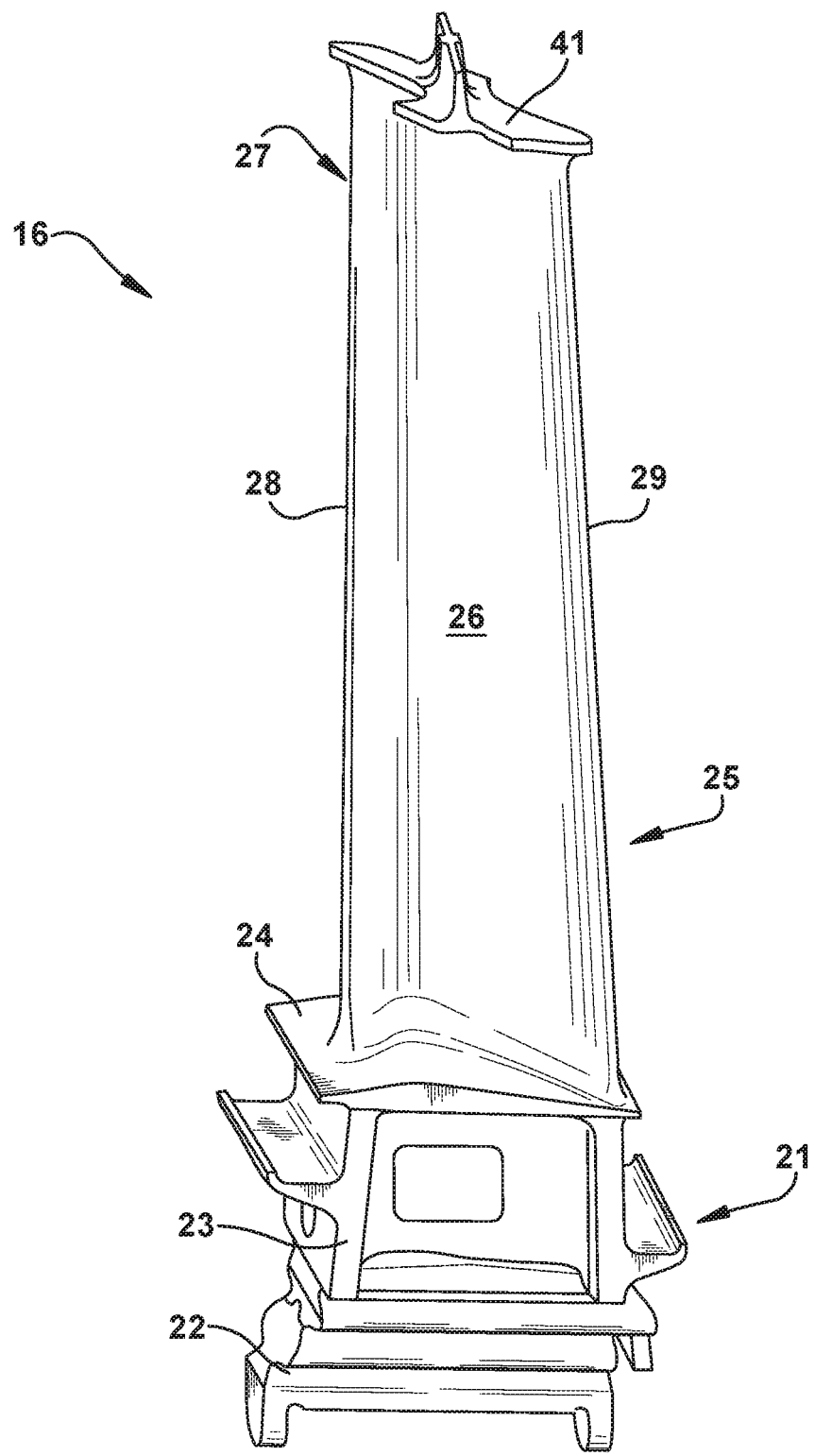
FIG. 4 is a perspective view of an exemplary turbine rotor blade having a conventional tip shroud.

With particular attention now to FIG. 4, the rotor blade 16 may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, with the airfoil being the active component of the rotor blade 16 that intercepts the flow of working fluid through the turbine 12 and induces the desired rotation. The platform 24 may define the inboard end of the airfoil 25. The platform 24 also may define a section of the inboard boundary of the working fluid flowpath through the turbine 12.

The airfoil 25 of the rotor blade typically includes a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip, which may include a tip shroud 41. The airfoil 25 may include a curved or contoured shape that is designed for promoting desired aerodynamic performance. The rotor blade 16 may further include an internal cooling configuration having one or more cooling channels through which a coolant is circulated during operation. Such cooling channels may extend radially outward from a connection to a supply source formed through the root 21 of the rotor blade 16. The cooling channels may be linear, curved or a combination thereof, and may include one or more outlet or surface ports through which coolant is exhausted from the rotor blade 16 and into the working fluid flowpath.

As used herein, the rotor blade 16 and components thereof may be described according to orientation characteristics of the turbine 12. It should be appreciated that, in such cases, the rotor blade 16 is assumed to be properly installed within the turbine 12. Such orientation characteristics may include radial, axial, and circumferential directions defined relative to the central axis 19 of the turbine 12. Forward and aftward directions may be defined relative to a forward end of the turbine 12, at where the working fluid enters the turbine 12 from the combustor 13, and an aftward end of the turbine 12, at where the working fluid exits the turbine 12. A rotation direction may be defined relative to an expected direction of rotation of the rotor blade 16 about the central axis 19 of the turbine 13 during operation. As will be appreciated, according to these orientation characteristics, the seal rail 42 may be described as projecting from the outboard surface 44 of the tip shroud 41 along an axis approximately aligned with the radial direction to define a height. The seal rail 42 may extend along an axis approximately aligned with the circumferential direction to define a length. As illustrated, relative to the length, the seal rail 42 may have a narrow thickness that extends along an axis approximately aligned with the axial direction.

Figure 5:
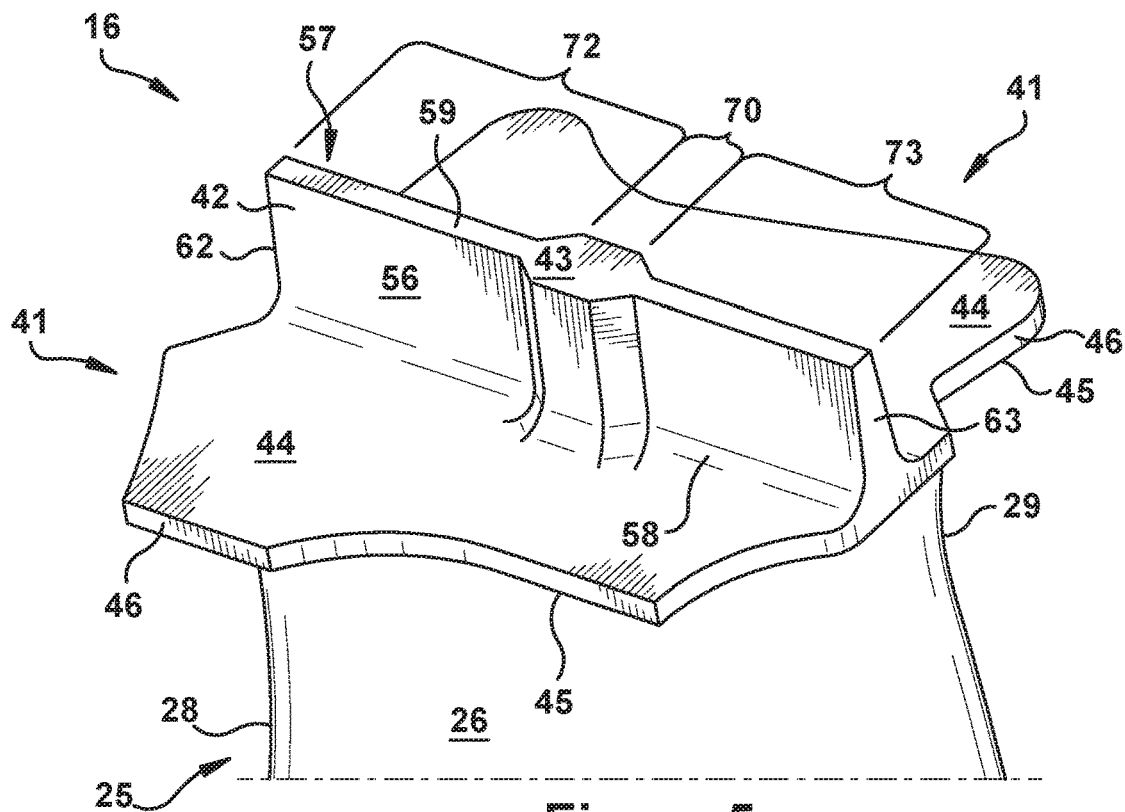
FIG. 5 is a perspective view of a tip shroud of a conventional turbine rotor blade having a single seal rail.
Figure 6:
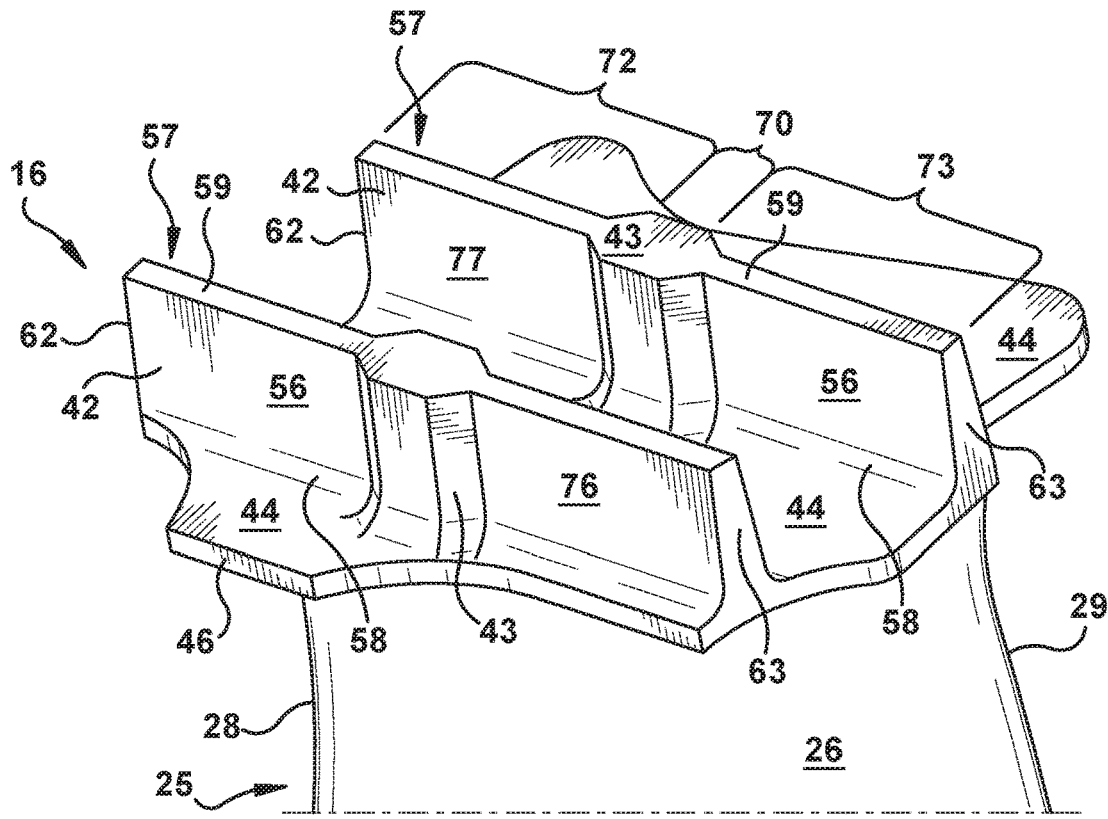
FIG. 6 is a perspective view of a tip shroud of a conventional turbine rotor blade having a two seal rails.

With particular reference now to FIGS. 5 and 6, the tip shroud 41 may be positioned near or at the outboard end of the airfoil 25. The tip shroud 41, generally, may include an axially and circumferentially extending planar component, which is supported towards its center by the airfoil 25. For descriptive purposes and as used herein, the tip shroud 41 includes an inboard surface 45 and an outboard surface 44, as well as a shroud edge or edge 46. The inboard surface 45 generally opposes the outboard surface 44 across the narrow radial thickness of the tip shroud 41. The edge 46 of the tip shroud 41 connects the inboard surface 45 to the outboard surface 44. As used herein, the edge 46 of the tip shroud 41 defines a peripheral profile or shape of the tip shroud 41.

The tip shroud 41 also may include one or more seal rails projecting from the outboard surface 44. As provided, FIG. 5 shows a tip shroud 41 that has a single seal rail 42, while the tip shroud 41 of FIG. 6 shows one having dual seal rails 42. As provided below, the configurations shown for any of the seal rails 42 may be used with each of these configurations. In general, the seal rail 42 is a fin-like projection that extends radially outward from the outboard surface 44 of the tip shroud 41. As illustrated, the seal rail 42 may extend circumferentially between opposite ends of the tip shroud 41 and, thus, may be described as being aligned relative to the direction of rotation or "rotation direction" of the rotor blade 16. The seal rail 42 may extend across substantially the entire circumferential length of the outboard surface 44 of the tip shroud 41. As used herein, the circumferential length of the tip shroud 41 is the length of the tip shroud 41 in the rotation direction 50. As described more below, each of the one or more seal rails 42 may include a cutter tooth 43.

For descriptive purposes and as used herein, the seal rails 42 include opposing rail faces, in which a forward rail face 56 corresponds to the forward direction of the gas turbine, and an aftward rail face 57 corresponds with the aftward direction. In instances where two seal rails 42 are provided on the tip shroud 41, a forward seal rail 76 may similarly be differentiated from an afterward seal rail 77. As will be appreciated, the forward rail face 56 faces toward or into the flow direction of working fluid through the turbine 13, while the aftward rail face 57 faces away from it. As shown, the seal rail 42 may have an approximately rectangular profile. Thus, the forward rail face 56 and the aftward rail face 57 may have a rectangular shape. Further, the forward rail face 56 and the aftward rail face 57 of the seal rail 42 may connect along circumferentially narrow rail edges, which, as used herein, are designated: opposing and approximately parallel outboard and inboard rail edges; and opposing and approximately parallel rotationally leading and rotationally trailing rail edges. Specifically, the inboard rail edge 58 may be defined at the interface between the seal rail 42 and the outboard surface 44 of the tip shroud 41. The outboard rail edge 59 is radially offset from the outboard surface 44 of the tip shroud 41. This radial offset, as will be appreciated, generally represents the radial height of the seal rail 42. As will be appreciated, the rotationally leading rail edge 62 juts radially from the edge 46 of the tip shroud 41 that overhangs the suction face 27 of the airfoil 25. Configured thusly, the rotationally leading rail edge 62 is so designated because it "leads" the seal rail 42 as the rotor blade 16 rotates during operation. At the opposite end of the seal rail 42, the rotationally trailing rail edge 63 juts radially from the edge 46 of the tip shroud 41 that overhangs the pressure face 26 of the airfoil 25. The rotationally trailing rail edge 63, thus, is so designated because it "trails" the seal rail 42 as the rotor blade 16 rotates during operation.

As used herein, the seal rail 42 is described as having non-overlapping circumferential sections, which may be defined relative to a cutter tooth section 70 that coincides with the circumferential length and position of the cutter tooth 43. Thus, as indicated in FIGS. 5 and 6, used herein, a rotationally leading section 72 and a rotationally trailing section 73 of the seal rail 42 may be defined to each side of the cutter tooth 43. Specifically, as illustrated, the rotationally leading section 72 extends from the cutter tooth section 70 to the rotationally leading rail edge 62, while the rotationally trailing section 73 extends from the cutter tooth section 70 to the rotationally trailing rail edge 63. As will be seen, these designated circumferential sections will be used in relation to FIGS. 9 through 20 to describe exemplary embodiments of the present invention.

The tip shroud 41 may include fillet regions that are configured to provide smooth surficial transitions between the divergent surfaces between the tip shroud 41 and the airfoil 25, as well as those between the tip shroud 41 and the seal rail 42. As such, configurations of the tip shroud 41 may include an outboard fillet region that is formed between the outboard surface 44 of the tip shroud 41 and each of the forward rail face 56 and aftward rail face 57 of the seal rail 42. The tip shroud 41 may further include an inboard fillet region that is formed between the inboard surface 45 of the tip shroud 41 and the pressure and suction faces 26, 27 of the airfoil 25. These fillet regions may be configured to provide smoothly curving transitions between the several planar surfaces that would otherwise have abrupt or steeply angle transitions. As will be appreciated, such fillet regions may improve aerodynamic performance as well as spread stress concentrations that would otherwise occur in those areas.

Figure 7:
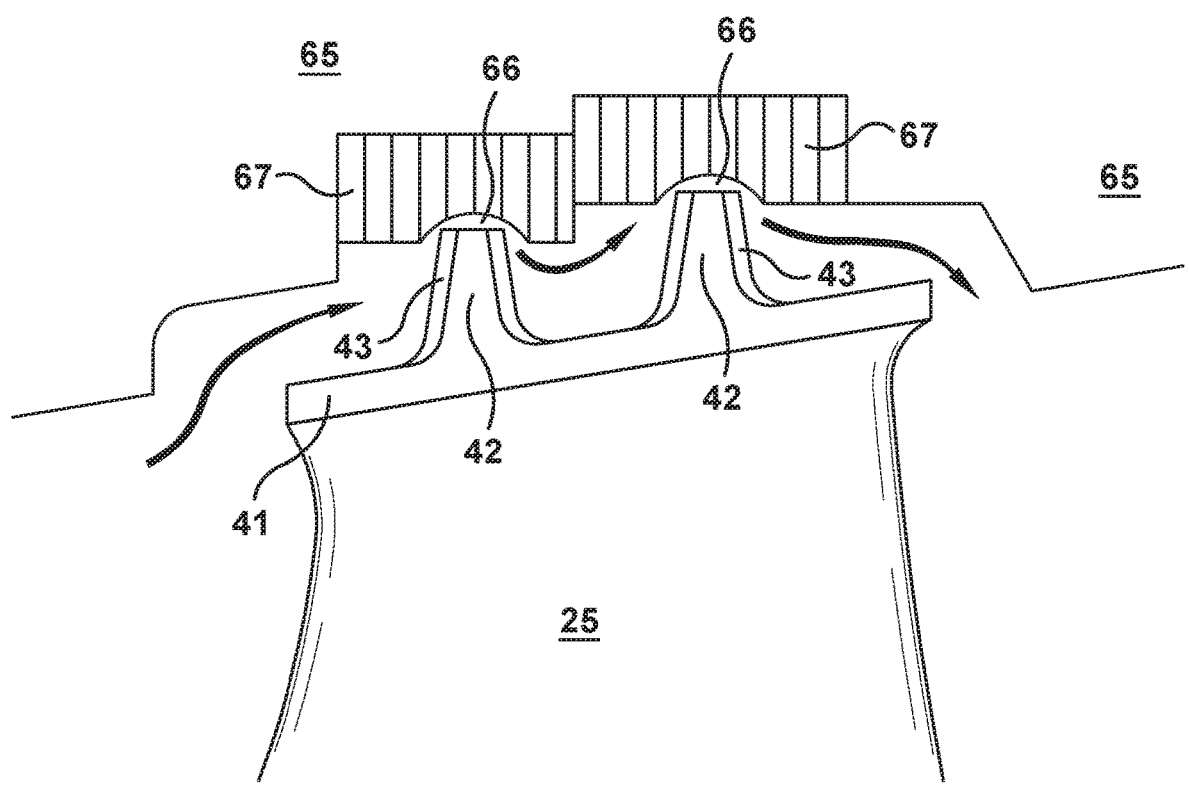
FIG. 7 is a side view of an exemplary interface formed between the seal rails of a shrouded turbine rotor blade and the stationary structure that opposes it.

As will be appreciated, the seal rail 42 typically is used to deter leakage across the stages of the turbine, as this leakage has a negative impact on engine efficiency. With particular reference now to FIG. 7, a side view is provided of an exemplary interface formed between the seal rails 41 of a shrouded turbine rotor blade and the stationary structure 65 that surrounds the stage of rotor blades. As shown, the seal rails 42 extend radially so to narrow a radial gap 66 that exists between the tip shroud 41 and the surrounding stationary structure 65 that defines the outboard boundary of the working fluid flowpath. In some conventional designs, the stationary structure 65 may include an abradable or honeycomb shroud 67 that directly opposes the tip shroud 41 across the radial gap 66. In operation, the seal rail 42 may extend radially into the honeycomb shroud 67 so to cut a path through it. In such cases, the cutter tooth 43 is provided for cutting a groove in the honeycomb shroud 67 that is slightly wider than the width of the seal rail 42. As will be appreciated, the honeycomb shroud 67 may be provided to enhance seal stability, and the use of the cutter tooth 43 may reduce spillover and rubbing between stationary and rotating parts by clearing this wider path. In general terms, the cutter tooth 43 is an area of increased width along the circumferential length of the seal rail 42. More particularly, the cutter tooth 43 may include a narrow circumferential section of the seal rail 42 that is axially thickened. As illustrated, this axially thickened region may extend radially between the outboard surface 44 of the tip shroud 41 and the outboard edge of the seal rail 42. The cutter tooth 43 may be positioned near the center or middle region of the seal rail 42 so that it is supported over the profile of the airfoil 25. Other locations of the cutter tooth 43 are also possible.

Figure 8:
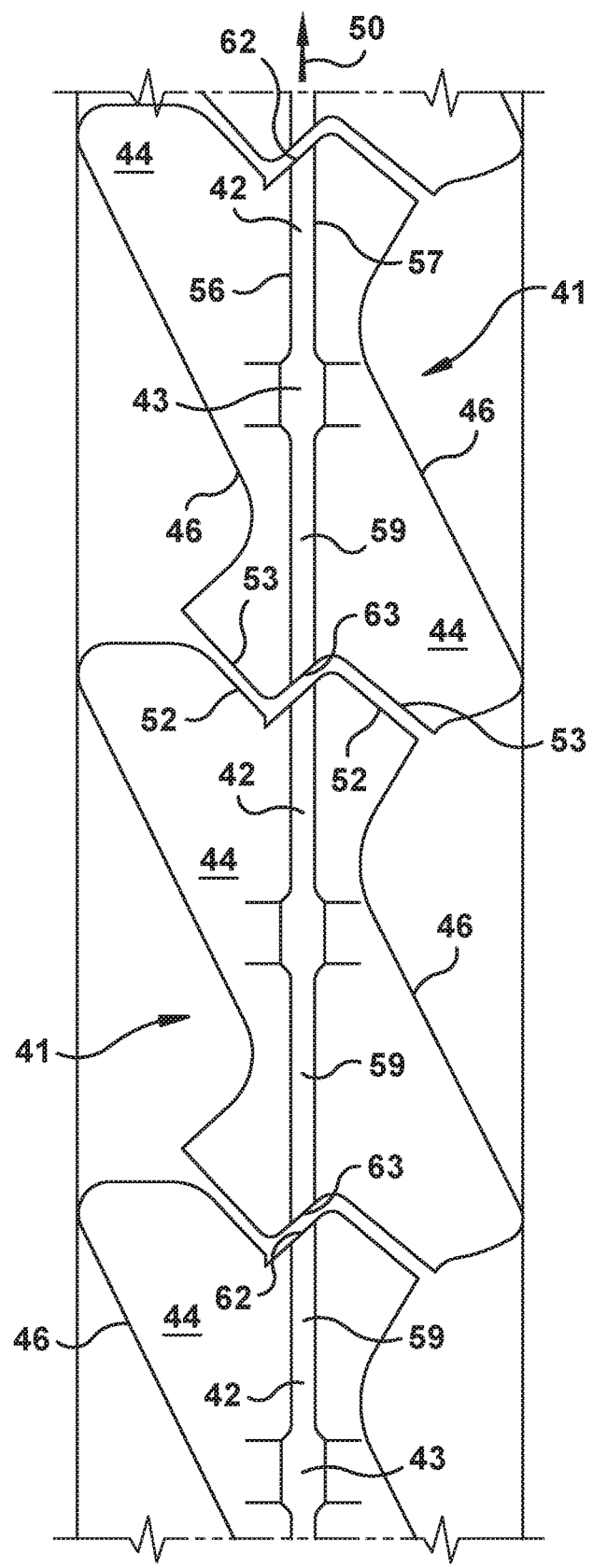
FIG. 8 is an outboard perspective of an exemplary installed arrangement of tip shrouded turbine rotor blades.

With particular reference now to FIG. 8, tip shrouds 41 may be configured to include a contact interface in which contact surfaces or edges engage like surfaces or edges formed on the tip shrouds 41 adjacent to it. This may be done, for example, to reduce leakage or harmful vibration. FIG. 8 provides an outboard view of the tip shrouds 41 of rotor blades as they might appear in an assembled condition. For descriptive purposes and as used herein, the edge 46 of the tip shroud 41 includes a rotationally leading contact edge and a rotationally trailing contact edge that are designated relative to the rotation direction 50 of the rotor blade. Thus, as indicated, the tip shroud 41 in a rotationally leading position has a rotationally trailing contact edge that contacts or comes in close proximity to the rotationally leading contact edge of the tip shroud 41 in the rotationally trailing position relative to it. This area of contact between the neighboring tips shrouds 41 may be generally referred to as a contact interface. Given the profile of the exemplary configuration, the contact interface also may be referred to as a "Z-notch" interface, though other configurations are also possible. More generally, in forming this contact interface, the edge 46 of a tip shroud 41 may be configured with a notched section that is intended to contact or engage a corresponding notched section in a neighboring tip shroud 41 in a desired manner. As further shown in FIG. 8, the profile of the tip shroud 41 from the outboard perspective may include a scallop shape, though other configurations are also possible. As will be appreciated, the exemplary scallop shape is one that performs well in terms of reducing leakage while also minimizing the weight of the tip shroud.

Turning now to FIGS. 9 through 20, the present invention will be discussed in relation to several exemplary embodiments. As will be seen, these embodiments propose several new configurations for the tip shrouds of rotor blades that, for example, may be used to advantageously affect the over-the-tip leakage occurring there. Specifically, it has been discovered that by increasing the over-the-tip leakage in the particular ways provided herein, certain aspects of performance may be enhanced. These benefits include reducing the temperatures and other stresses experienced by this particular region of the rotor blade during operation. While, in some cases, these stress reductions may be incremental in nature, they may nonetheless lead to significant performance benefits because of the region of the blade they affect. As will be appreciated, this outer radial portion of the rotor blade—which includes the outer radial tip of the airfoil and the tip shroud that is supported there—is one that is critical in determining the life of the component. Because of this life-limiting aspect of this region, a modest or even incremental reduction of certain stressors may lead to disproportionate benefits in terms of extending component life.

More specifically, as will be seen, the several seal rail configurations that are proposed herein are formed to allow increased levels of over-the-tip leakage. This leakage is then directed and channeled along particular leakage flow paths that are induced by the present configurations. While such leakage typically has a negative effect on engine efficiency, it has been discovered that the resulting benefits to the rotor blade's useful life may more than offset this negative as long as the increased leakage flows are metered and/or controlled. For example, one factor that allows this offsetting benefit is the fact that, as mentioned above, the useful life of rotor blades is often limited by the durability of this outer radial region. That is to say, the manner in which this area endures the extreme operational stresses that occur here is typically a significant factor in determining the useful life of the rotor blade. As will be appreciated, the high stress levels in this region of the rotor blade are caused by a number of factors, including the narrowness of the airfoil in this area, higher rotational velocities, weight of the tip shroud, stress concentrating geometries, and the manner in which the tip shroud is cantilevered outward from the supporting airfoil. As a result, this region is more susceptible to suffering life-limiting damage when, for example, localized hotspots develop. It has been discovered that, by allowing the additional over-the-tip leakage as proposed herein, the occurrence of such localized hotspots may be significantly reduced or even prevented. Other advantages of the present configurations include a reduction of mechanical stresses, including alleviating certain harmful vibratory responses. Another benefit relates to the manner in which the present invention may be used to reduce the weight of the tip shroud by removing portions of the seal rail.

With particular attention now to the several provided figures, several examples are provided that show how the seal rails of the present invention may be used in conjunction with different types of tip shrouds. As illustrated in FIGS. 9 through 16, the present seal rails are shown in relation to a tip shroud having a dual seal rail configuration. As shown in FIGS. 17 through 20, alternative seal rail configurations are shown in relation to tip shrouds having a single seal rail. Unless otherwise stated, it should be understood that each of the different seal rail configurations provided in relation to FIGS. 9 through 20 may be used as part of a single or dual seal rail arrangement. Thus, those seal rail configurations shown in relation to any of seal rails in a dual seal rail configuration may be used alone as part of a single seal rail configuration. It should be further understood that, unless stated otherwise, any seal rail configuration that is shown in the figures as applying to a single seal rail tip shroud also may be used for a seal rail in a dual seal rail arrangement.

Figure 15:
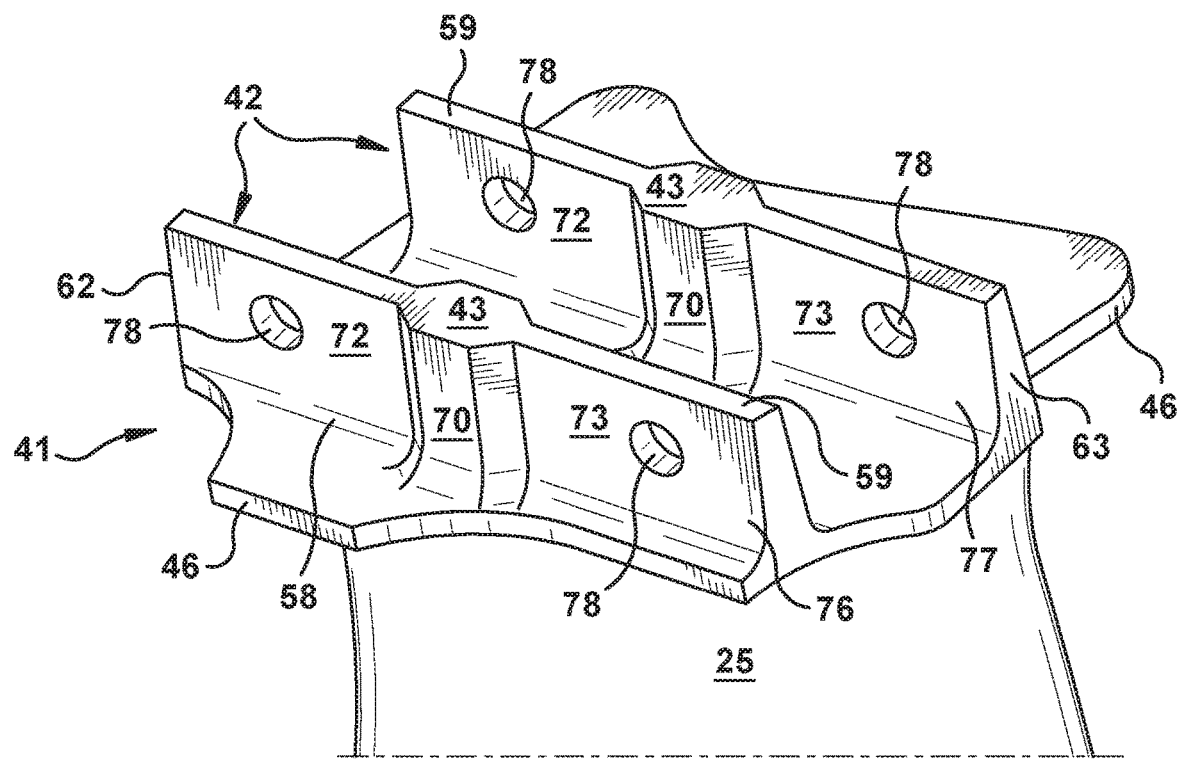
FIG. 15 is a perspective view of a tip shroud rotor blade having dual seal rails in accordance with an exemplary embodiment of the present invention.
Figure 16:
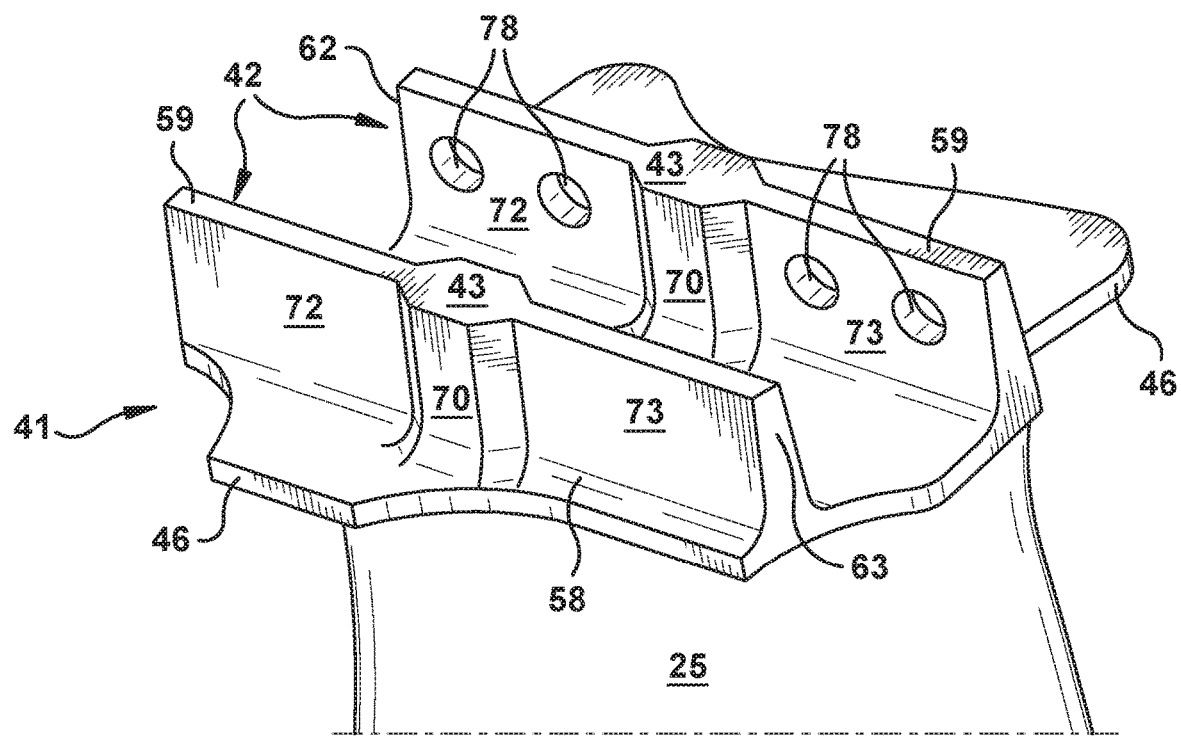
FIG. 16 is a perspective view of a tip shroud rotor blade having dual seal rails in accordance with an exemplary embodiment of the present invention.

Accordingly, the present invention includes a tip shroud 41 having one or more seal rails 42 in which at least one of those seal rails 42 form a leakage gap 78 that, as provided herein, is configured for allowing increased levels of over-the-tip leakage. As will be seen, according to some embodiments, the leakage gap 78 is formed by reducing the height of the seal rail 42 over a circumferentially defined section, examples of which are shown in the exemplary embodiments of FIGS. 9 through 14 and 17 through 20. According to other embodiments, as shown in FIGS. 15 and 16, the leakage gap 78 is formed via a port that is extends through the thickness of the seal rail 42.

With particular attention now to FIGS. 9 through 14, several exemplary tip shrouds 41 are shown having dual seal rail configurations wherein a leakage gap 78 is formed by reducing the height of at least one of those seal rails 42 within a circumferentially defined section. As will be seen, one manner in which this type of seal rail configuration will be defined and particularly described is by reference herein to designated "height sections" of the seal rail 42. As used herein, such "height sections" will represent circumferentially defined reference sections of the seal rail and will be described as occurring within circumferentially defined limits along the circumferential length of the seal rail 42. It should be understood that these "height sections" circumferentially divide (for the sake of reference only) the entirety of the length of the seal rail 42 into two non-overlapping sections: a first height section 81, which will refer to the height section in which the leakage gap 78 is formed; and a second height section 82, which will refer to the height section that does not include the leakage gap. As will be understood, for illustration purposes, in those height sections where the height of the seal rail 42 is intended to be reduced to form a leakage gap 78, a dotted outline of the full (unreduced) height of the seal rail 42 is provided. In this manner, the location and the extent of the height reduction within that particular height section of the seal rail 42 may be clearly illustrated. As also provided below, the particular seal rail configurations of the present invention may be further described by differentiating between the seal rails within a dual seal rail arrangement according to relative forward and aftward positioning via referencing forward and aftward seal rails. For more particular description within a single seal rail, reference also may be made to the rotationally leading and trailing edge sections, which, as already described, are defined relative to the rotation direction of the rotor blade in operation and the location of the cutter tooth section that is positioned therebetween.

Figure 9:
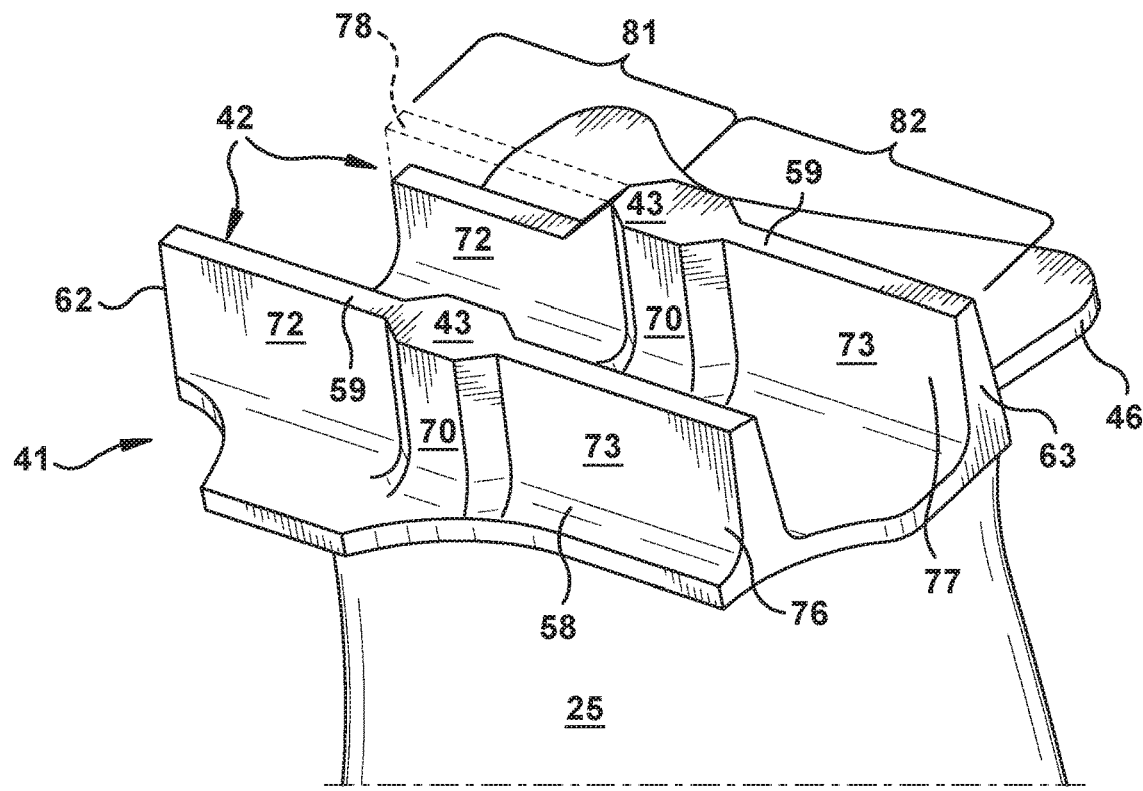
FIG. 9 is a perspective view of a tip shroud rotor blade having dual seal rails in accordance with an exemplary embodiment of the present invention.
Figure 10:
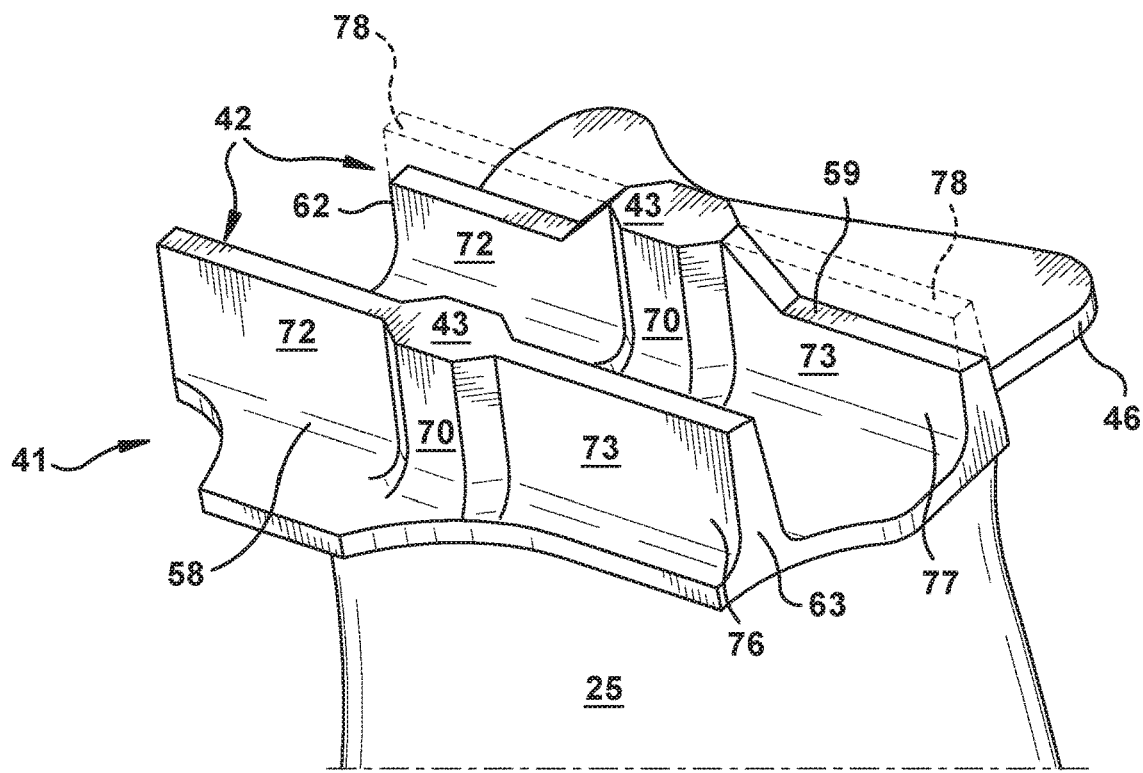
FIG. 10 is a perspective view of a tip shroud rotor blade having dual seal rails in accordance with an exemplary embodiment of the present invention.
Figure 11:
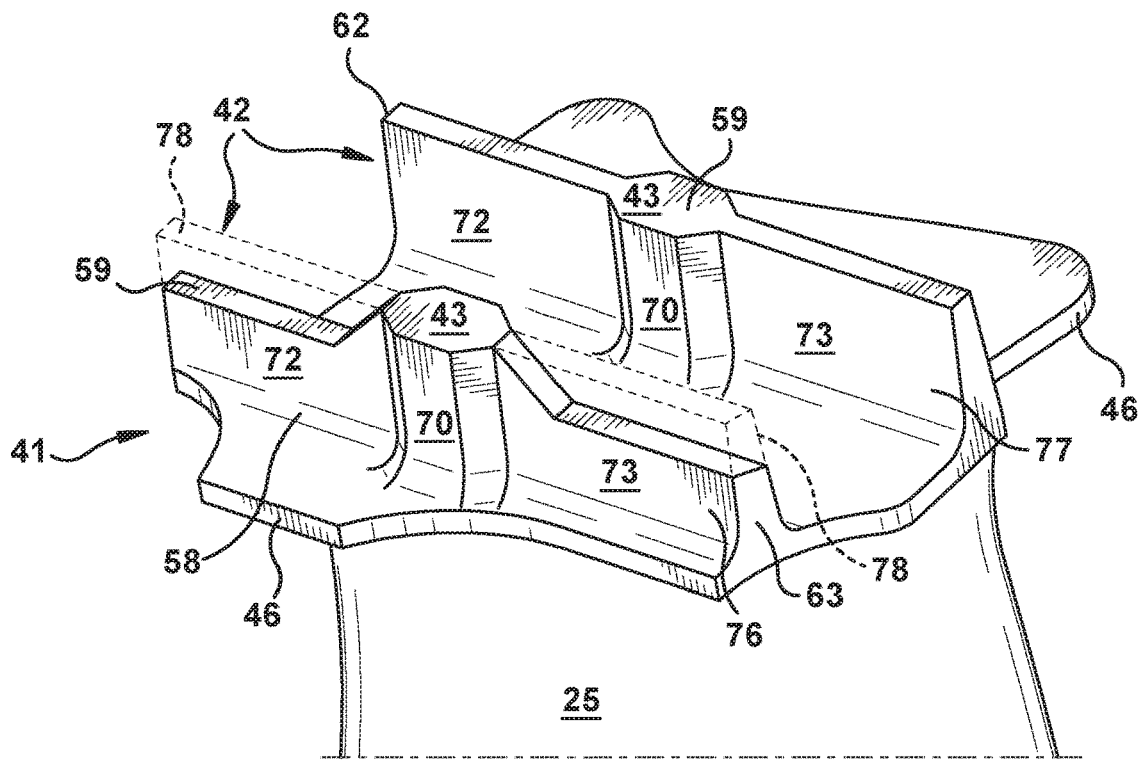
FIG. 11 is a perspective view of a tip shroud rotor blade having dual seal rails in accordance with an exemplary embodiment of the present invention.

Thus, as shown in the example of FIG. 9 through 11, according to certain preferred embodiments, the leakage gap 78 of the present invention may be formed on either the forward seal rail 76 or the aftward seal rail 77, and may be absent on the other. Thus, in FIGS. 9 and 10, the leakage gap 78 is shown on the aftward seal rail 77, while being absent on the forward seal rail 76, whereas in FIG. 11, the leakage gap 78 is shown on the forward seal rail 76, while being absent on the aftward seal rail 76. As stated above, with regard to the type and positioning of the leakage gap 78, the seal rail configurations shown FIGS. 9 through 11 may be used on the seal rails of tip shrouds having only one seal rail.

In FIG. 9, the leakage gap 78 may be more specifically described as being formed on the rotationally leading edge section 72 of the aftward seal rail 76. In example provided, the leakage gap 78 is formed via the rotationally leading edge section 72 of the aftward seal rail 76 having an appreciably reduced height compared to the other sections or remainder of the aftward seal rail 76. This configuration may alternatively be described with reference to the first and second height sections 81, 82 that were previously discussed. As will be appreciated, the first height section 81 in this example may be defined as the approximate entirety of the rotationally leading edge section 72, and the second height section 82 being defined as the approximate entirety of both the cutter tooth section 70 and the rotationally trailing edge section 73. In an alternative arrangement (not shown), the leakage gap 78 may instead be formed on the rotationally trailing edge section 73. Accordingly, in generally describing possible embodiments of the present invention with regard to the first and second height sections 81, 82, the first height section 81 may include either one of the rotationally leading section 72 or rotationally trailing section 73, with the second height section 82 then including both: the remaining one of the rotationally leading section 81 and rotationally trailing sections 82; and the cutter tooth section. As shown, the reduced height of the seal rail 42 within the first height section 81 may be substantially constant. However, as provided in FIGS. 17 through 20, other possible configurations include a seal rail height that varies within the first height section 81. The height of the seal rail 42 within the second height section 82 may be substantially constant.

In defining the nature of the leakage gap 78, the appreciably reduced height of the first height section 81 may be defined relative to the height of the second height section 82. According to preferred embodiments, the appreciably reduced height of the first height section 81 is one that is less than 90% of the height of the second height section. According to other embodiments, the appreciably reduced height may be defined relative to the height of the cutter tooth 43 or the cutter tooth section 70. For example, the appreciably reduced height may be one of between 40% and 90% of the height of the seal rail 42 within the cutter tooth section 43. According to still other embodiments, as provided below, the appreciably reduced height is one of between 50% and 80% of the height of the seal rail 42 within the cutter tooth section 43.

According to other embodiments, the leakage gap 78 may be formed as a reduced height section on each of the rotationally leading and trailing sections 72, 73. Examples of this type of embodiment are provided in FIGS. 10 and 11. As will be appreciated, in FIG. 10, the aftward seal rail 77 is configured in this manner, while in FIG. 11, it is the forward seal rail 76. In each exemplary configuration both: the height of the seal rail 42 within the rotationally leading section 72 is appreciably reduced compared to the height of the seal rail 42 within the cutter tooth section 70; and the height of the seal rail 42 within the rotationally trailing section 73 is appreciably reduced compared to the height of the seal rail 42 within the cutter tooth section 70. According to preferred embodiments, the rotationally leading section 72 and the rotationally trailing section 73 each may have a seal rail height of between 40% and 90% of the height of the seal rail 42 within the cutter tooth section 70. According to other embodiments, the rotationally leading section 72 and the rotationally trailing section 73 each may have a seal rail height of between 50% and 80% of the height of the seal rail 42 within the cutter tooth section 70. As illustrated in FIG. 10, the reduction in height of the seal rail 42 within the rotationally leading section 72 and the rotationally trailing section 73 may be configured such that each are approximately equal. Alternatively, as illustrated in FIG. 11, the relative heights of the seal rail within these sections may be offset or different. For example, as shown in FIG. 11, the height of the seal rail 42 within the rotationally leading section 72 is greater than that of the rotationally trailing section 73.

Figure 12:
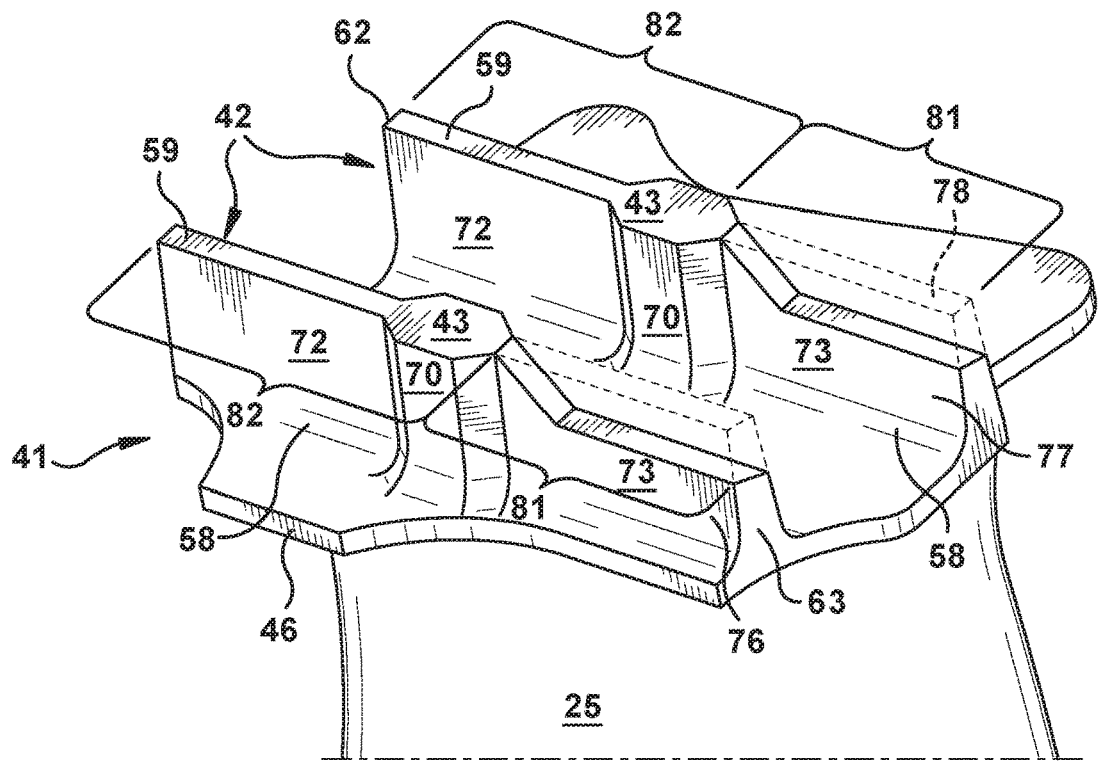
FIG. 12 is a perspective view of a tip shroud rotor blade having dual seal rails in accordance with an exemplary embodiment of the present invention.
Figure 13:
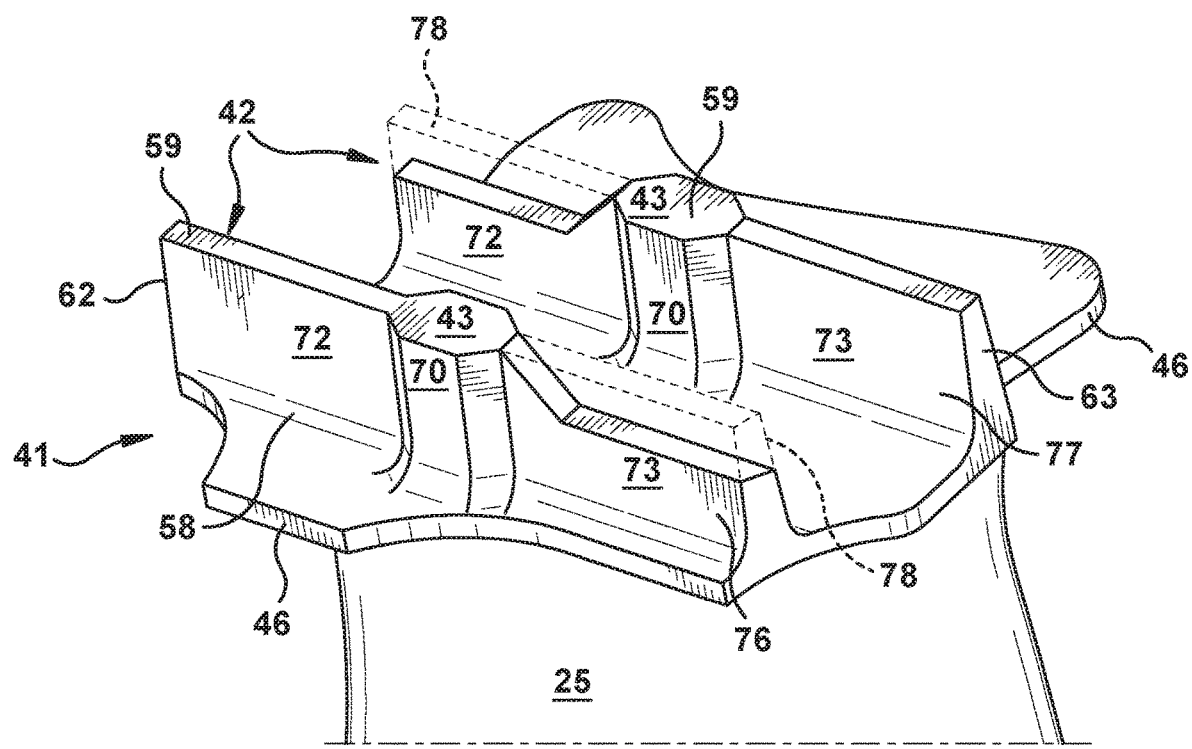
FIG. 13 is a perspective view of a tip shroud rotor blade having dual seal rails in accordance with an exemplary embodiment of the present invention.
Figure 14:
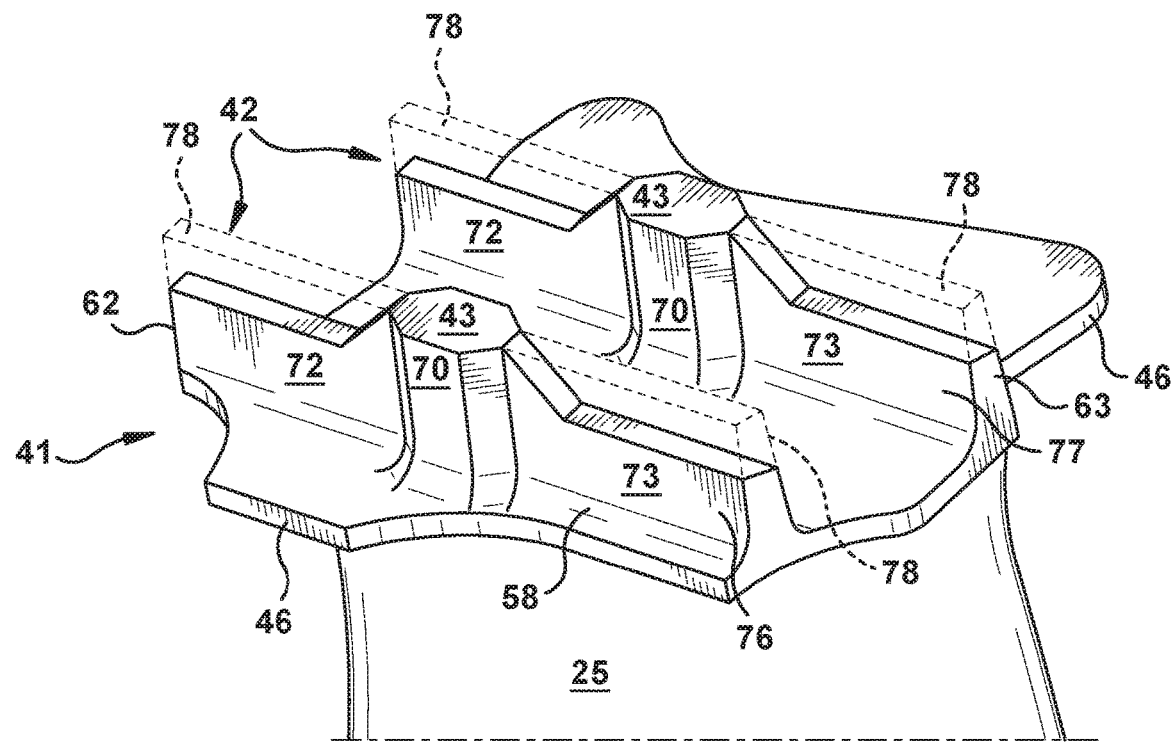
FIG. 14 is a perspective view of a tip shroud rotor blade having dual seal rails in accordance with an exemplary embodiment of the present invention.

As illustrated FIGS. 12 through 14, alternative embodiments of the present invention include instances where the leakage gap 78 is formed as reduced height circumferential sections on each of the forward and aftward seal rails 76, 77. These configurations may be formed consistent with the principles already described. According to an exemplary embodiment, as shown in FIG. 12, the rotationally trailing section 73 of both the forward seal rail 76 and the aftward seal rail 77 are configured to include the leakage gap 78 in the form of a reduced height section. As illustrated in FIG. 13, the rotationally trailing section 73 of the forward seal rail 76 and the rotationally leading section 72 of the aftward seal rail 77 may be configured to include the leakage gap 78 in the form of a reduced height section. As illustrated in FIG. 14, according to another embodiment, the rotationally leading and trailing sections 72, 73 of both the forward seal rail 76 and the aftward seal rail 77 are configured to include the leakage gap 78 in the form of a reduced height section. Other possible configurations are also possible.

As illustrated FIGS. 15 and 16, alternative embodiments of the present invention include cases where the leakage gap 78 is formed as one or more ports defined through the seal rail 42 instead of the reduced height sections discussed above. Such ports may be generally defined as an enclosed passageway that extends axially through the thickness of the seal rail 42 between an inlet formed through the forward rail face 56 and an outlet formed through the aftward rail face 57. In such cases, as illustrated, the height of the seal rail 42 within the cutter tooth section 70, the rotationally leading section 72, and the rotationally trailing section 73 may be substantially constant and unreduced. According to exemplary embodiments, the leakage gap 78 includes at least one of the ports being formed through at least one of the rotationally leading and rotationally trailing sections 72, 73 of at least one of the forward and aftward seal rails 76, 77. According to the exemplary embodiment of FIG. 15, the leakage gap 78 includes a single port being formed through each of the rotationally leading and rotationally trailing sections 72, 73 of both the forward and aftward seal rails 76, 77. According to alternative embodiments, the leakage gap 78 may include multiple instances of the port being formed through any of the various sections of either seal rail. An example of this is provided in FIG. 16, which includes an arrangement in which the leakage gap 78 includes multiple ports being formed through the rotationally leading and rotationally trailing sections 72, 73 of the aftward seal rail 77. As shown, the forward seal rail 76 may be left intact so that it does not include the leakage gap 78.

In the previous examples, the reduced height sections that formed the exemplary leakage gaps 78 where shown as having a constant height. According to other embodiments, as shown in FIGS. 17 through 20, the leakage gap 78 also may be formed as a reduced height seal rail section in which seal rail height varies according to circumferential position according to a preferred contoured or shape, which will be referred to herein as a "shaped profile". Although each of the embodiments provided in FIGS. 17 through 20 illustrate the shaped profile as being included on both the rotationally leading and rotationally trailing sections 72, 73, it will be appreciated that this exemplary only. It should be understood that the shaped profile may be included on only one of the rotationally leading and rotationally trailing sections 72, 73 of the seal rail 42, with the remaining seal rail section having a constant height that, for example, may equal to the height of the cutter tooth section 70. Additionally, though the exemplary shaped profiles are illustrated in relation to tip shrouds 41 having a single seal rail 42, it should be understood that possible embodiments of the present invention include using such shaped profiles on tip shrouds 41 having dual seal rail configurations. It should further be understood that any of the preceding leakage gap configurations that were discussed in relation to tip shrouds having dual seal rail arrangements may be used on tip shrouds having only a single seal rail.

Figure 17:
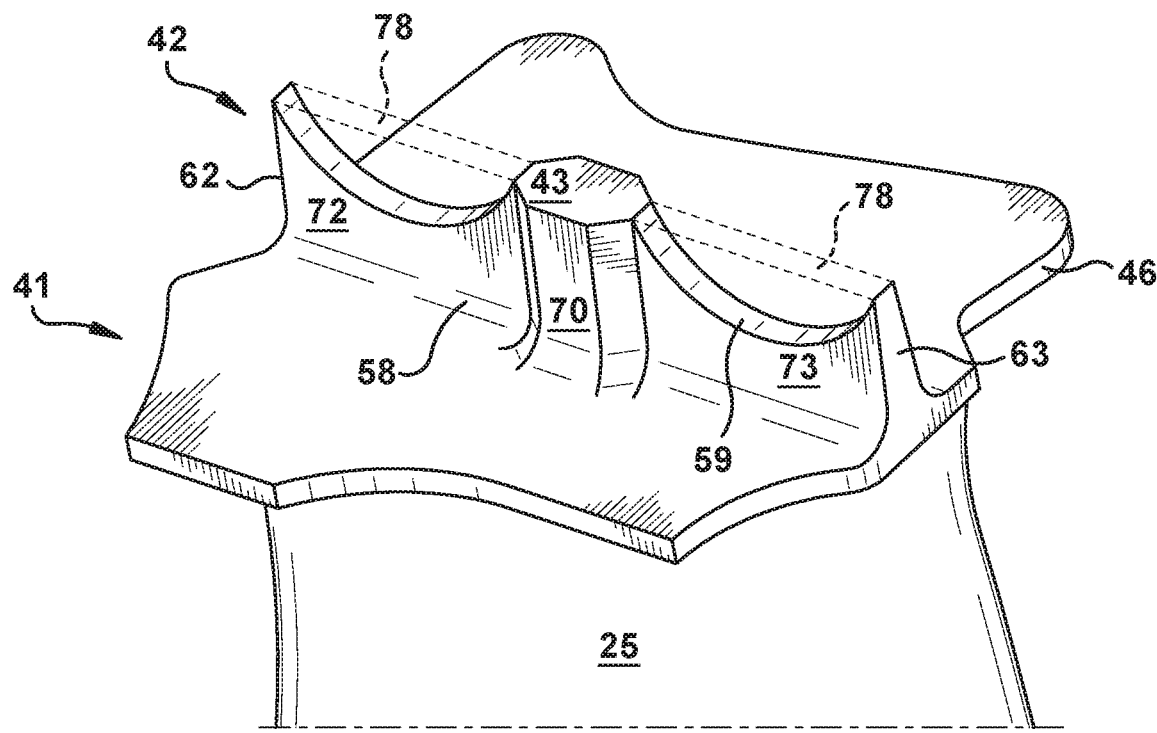
FIG. 17 is a perspective view of a tip shroud rotor blade having a single seal rail in accordance with an exemplary embodiment of the present invention.
Figure 18:
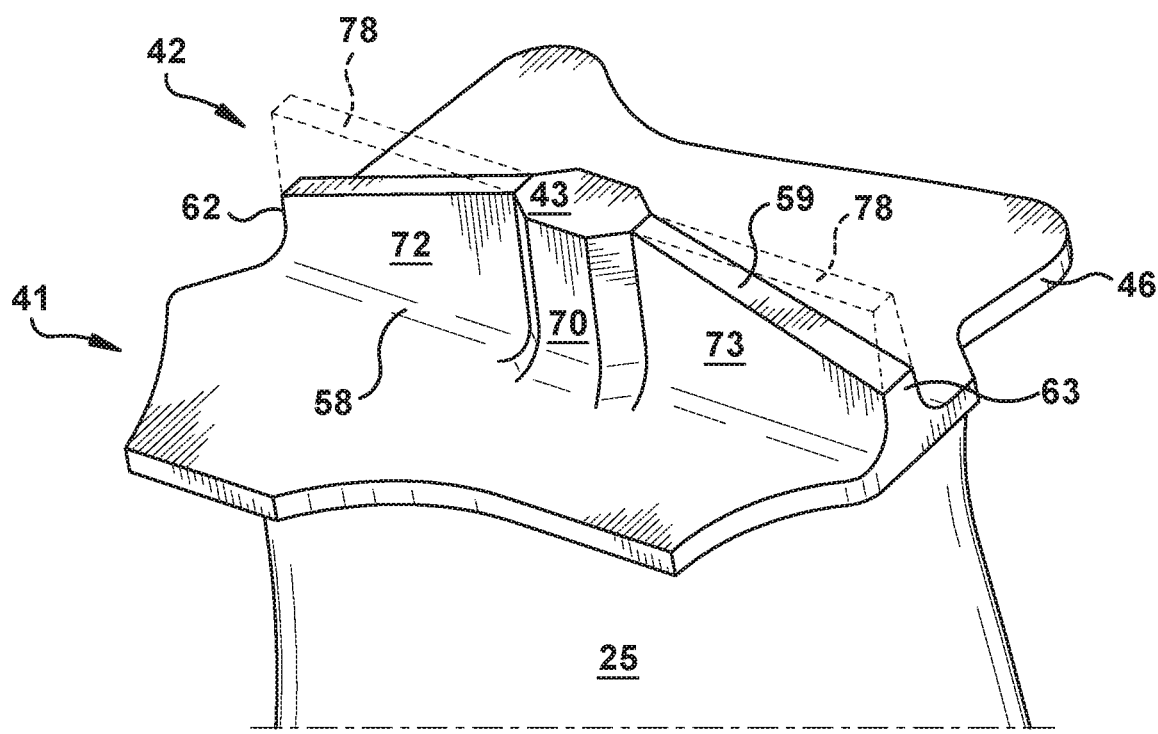
FIG. 18 is a perspective view of a tip shroud rotor blade having a single seal rail in accordance with an exemplary embodiment of the present invention.
Figure 19:
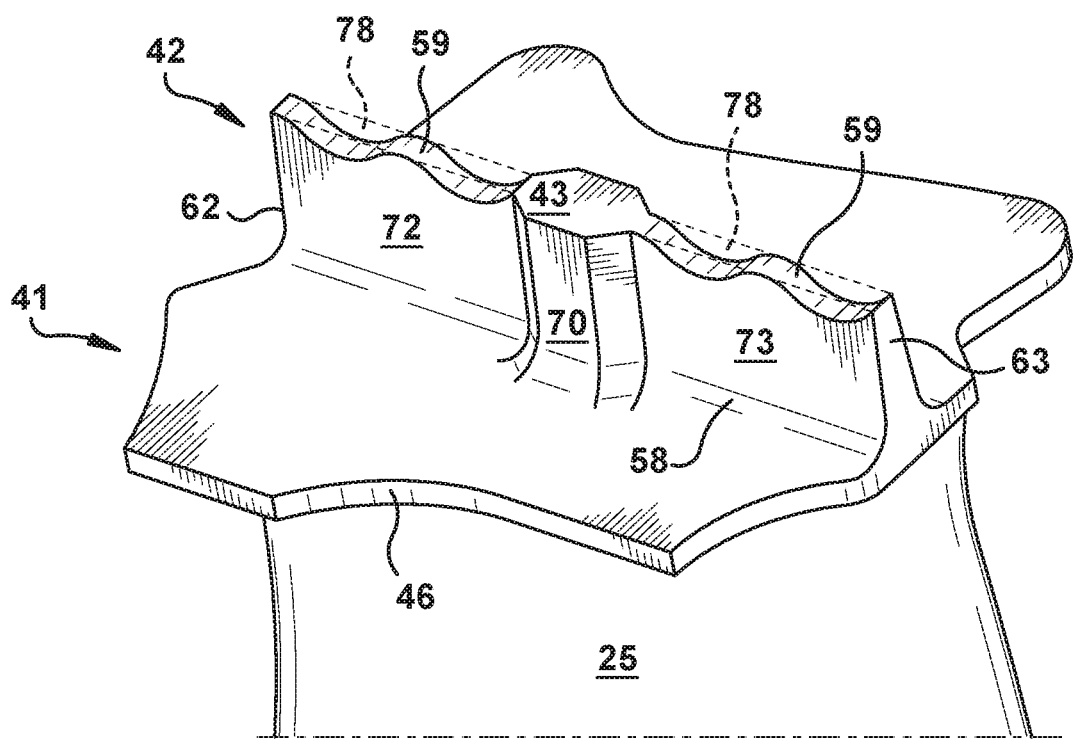
FIG. 19 is a perspective view of a tip shroud rotor blade having a single seal rail in accordance with an exemplary embodiment of the present invention.
Figure 20:
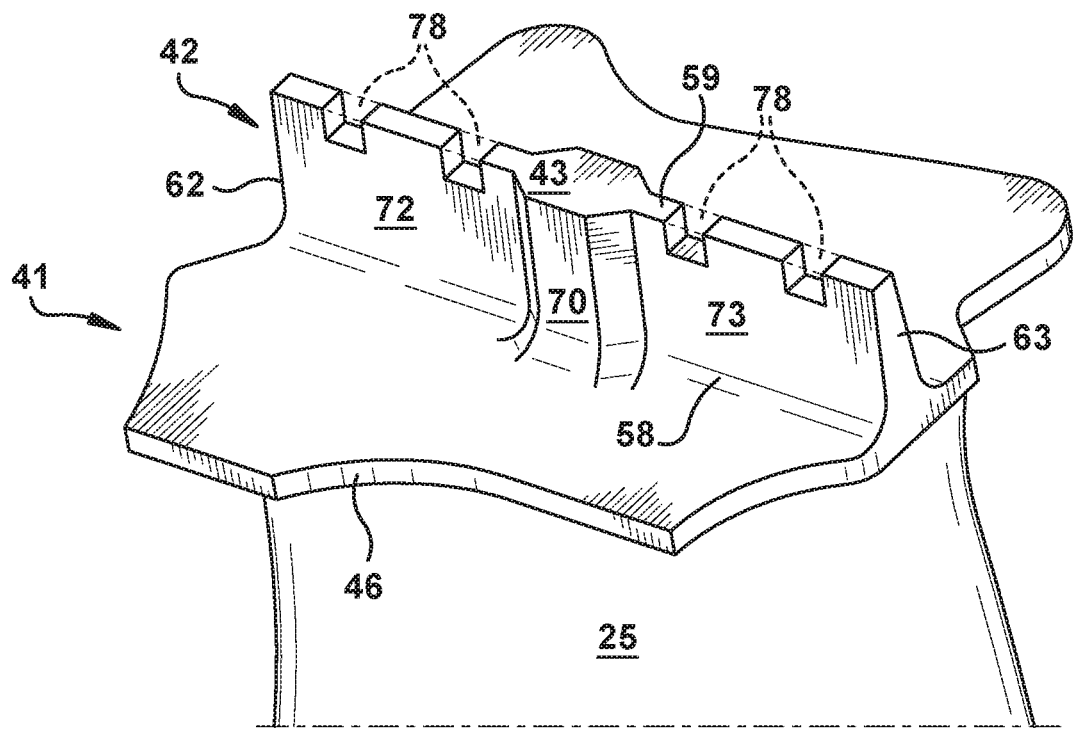
FIG. 20 is a perspective view of a tip shroud rotor blade having a single seal rail in accordance with an exemplary embodiment of the present invention.

As shown in FIG. 17, according to one preferred embodiment, the leakage gap 78 is formed by a shaped profile of the seal rail 42 that is concave along the shroud edge 46. In this example, the outboard rail edge 59 is configured as concave surface that dips and then returns to full height as it extends between the cutter tooth 43 and the rotationally leading rail edge or trailing rail edge 62, 63. As shown in FIG. 18, an alternative configuration of the shaped profile includes an inboard sloping profile in which the height of the seal rail 42 smoothly narrows or tapers as the seal rail extends away from the cutter tooth 43. As shown in FIGS. 19 and 20, according to other preferred embodiments, the shaped profile includes an undulating or corrugated along the shroud edge 46. This corrugated profile may be smoothly curved, such as the exemplary embodiment of FIG. 19, or may be more rectangular in nature, such as the exemplary embodiment of FIG. 20. Other embodiments are also possible.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for a turbine of a gas turbine, the rotor blade comprising:
   an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
   a tip shroud attached to the outboard tip of the airfoil, the tip shroud comprising: an axially and circumferentially extending planar component in which an inboard surface opposes an outboard surface; and a shroud edge that connects the inboard surface to the outboard surface and defines an outboard profile of the tip shroud;
   a seal rail protruding from the outboard surface of the tip shroud along a first axis corresponding to a radial direction to define a height, the seal rail extending along a second axis corresponding to a circumferential direction to define a length, the seal rail extending along a third axis, relative to the length, to define a narrow thickness in an axial direction;
   wherein the seal rail comprises:
   height sections between which the height of the seal rail varies, the height sections being circumferentially divided and dividing an entirety of the length of the seal rail into two non-overlapping sections: a first height section and a second height section;
   a cutter tooth coinciding with a cutter tooth section circumferentially defined within the seal rail, the cutter tooth section of the seal rail being axially thickened relative to the narrow thickness, an entirety of the cutter tooth section being disposed within the second height section;
   a leakage gap comprises the first height section of the seal rail, the first height section being appreciably reduced compared to the height of the seal rail within the second height section, the leakage gap being configured for increasing a leakage level during operation of the turbine within which the rotor blade is installed;
   opposing and substantially planar rail faces, including a forward rail face and an aftward rail face;
   wherein the narrow thickness in the axial direction is defined along a periphery of the seal rail by rail edges that span between the forward rail face and the aftward rail face;
   wherein the rail edges include:
   opposing inboard and outboard rail edges, the inboard rail edge being defined at a connection between the seal rail and the outboard surface of the tip shroud, the outboard rail edge being offset from the inboard rail edge by the height of the seal rail;
   opposing rotationally leading and rotationally trailing rail edges, each of which are positioned near the shroud edge, such that the rotationally leading rail edge leads the rotationally trailing edge during operation, given the rotation direction of the rotor blade when installed in the turbine.

2. The rotor blade according to claim 1, wherein the seal rail comprises circumferential sections defined relative to the cutter tooth, which include: a rotationally leading section; a cutter tooth section; and a rotationally trailing section;
   wherein:
   the cutter tooth section coincides with a circumferential length of the cutter tooth;
   the rotationally leading section extends from the cutter tooth section to the rotationally leading rail edge; and
   the rotationally trailing section extends from the cutter tooth section to the rotationally trailing rail edge.

3. The rotor blade according to claim 2, wherein the first height section comprises the rotationally leading section;
   wherein the second height section comprises both the cutter tooth section and the rotationally trailing section;
   wherein the appreciably reduced height of the first height section comprises less than 90% of the height of the second height section.

4. The rotor blade according to claim 2, wherein the first height section comprises the rotationally trailing section;
   wherein the second height section comprise both the cutter tooth section and the rotationally leading section;
   wherein the appreciably reduced height of the first height section comprises less than 90% of the height of the second height section.

5. The rotor blade according to claim 2, wherein the first height section comprises one of the rotationally leading and rotationally trailing sections;
   wherein the second height section comprises both:
   the other one of the rotationally leading and rotationally trailing sections; and
   the cutter tooth section;
   wherein the height of the second height section is substantially constant.

6. The rotor blade according to claim 5, wherein the height of the seal rail within the first height section varies such that the outboard edge of the first height section forms a shaped profile;
   wherein the shaped profile comprises a corrugated profile.

7. The rotor blade according to claim 5, wherein the height of the seal rail within the first height section varies such that the outboard edge of the first height section forms a shaped profile;
   wherein the shaped profile comprises an inboard sloping profile in which the height of the seal rail tapers as the first height section extends away from the cutter tooth section.

8. The rotor blade according to claim 5, wherein the height of the seal rail within the first height section varies such that the outboard edge of the first height section forms a shaped profile;
   wherein the shaped profile comprises a concave shroud edge.

9. A rotor blade for a turbine of a gas turbine, the rotor blade comprising:
   an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
   a tip shroud attached to the outboard tip of the airfoil, the tip shroud comprising: an axially and circumferentially extending planar component in which an inboard surface opposes an outboard surface; and a shroud edge that connects the inboard surface to the outboard surface and defines an outboard profile of the tip shroud;

a seal rail protruding from the outboard surface of the tip shroud along a first axis corresponding to a radial direction to define a height, the seal rail extending along a second axis corresponding to a circumferential direction to define a length, the seal rail extending along a third axis, relative to the length, to define a narrow thickness in an axial direction;

wherein the seal rail comprises:

opposing and substantially planar rail faces, including a forward rail face and an aftward rail face, the narrow thickness in the axial direction being defined along a periphery of the seal rail by rail edges that span between the forward rail face and the aftward rail face;

a cutter tooth coinciding with a cutter tooth section disposed on the seal rail, the cutter tooth section of the seal rail being axially thickened relative to the narrow thickness;

wherein the rail edges include:

opposing inboard and outboard rail edges, the inboard rail edge being defined at a connection between the seal rail and the outboard surface of the tip shroud, the outboard rail edge being offset from the inboard rail edge by the height of the seal rail;

opposing rotationally leading and rotationally trailing rail edges, each of which are positioned near the shroud edge, such that the rotationally leading rail edge leads the rotationally trailing edge during operation, given the rotation direction of the rotor blade when installed in the turbine;

a rotationally leading section that extends from the cutter tooth section to the rotationally leading rail edge; and a rotationally trailing section that extends from the cutter tooth section to the rotationally trailing rail edge; and a leakage gap, the leakage gap being configured for increasing a leakage level during operation of the turbine within which the rotor blade is installed;

wherein the leakage gap comprises both:

the height of the seal rail within the rotationally leading section being appreciably reduced compared to the height of the seal rail within the cutter tooth section; and the height of the seal rail within the rotationally trailing section being appreciably reduced compared to the height of the seal rail within the cutter tooth section.

10. The rotor blade according to claim 9, wherein the height of the seal rail within the rotationally leading section and the height of the rotationally trailing section each comprises between 50% and 80% of the height of the seal rail within the cutter tooth section;

wherein the height of the seal rail within the rotationally leading section and the height of the seal rail within the rotationally trailing section are approximately equal; and wherein the cutter tooth is positioned at the approximate circumferential midpoint of the seal rail such that a circumferential length of the rotationally leading section is approximately equal to a circumferential length of the rotationally trailing section.

11. The rotor blade according to claim 9, wherein the height of the seal rail within the rotationally leading section and the height of the rotationally trailing section each comprises between 40% and 90% of the height of the seal rail within the cutter tooth section;

wherein the height of the seal rail within the rotationally leading section and the height of the seal rail within the rotationally trailing section are different; and wherein the cutter tooth is positioned at the approximate circumferential midpoint of the seal rail such that a circumferential length of the rotationally leading section is approximately equal to a circumferential length of the rotationally trailing section.

12. A rotor blade for a turbine of a gas turbine, the rotor blade comprising:

an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;

a tip shroud attached to the outboard tip of the airfoil, the tip shroud comprising: an axially and circumferentially extending planar component in which an inboard surface opposes an outboard surface; and a shroud edge that connects the inboard surface to the outboard surface and defines an outboard profile of the tip shroud;

seal rails protruding from the outboard surface of the tip shroud along a first axis corresponding to a radial direction to define a respective height, the seal rails including a forward seal rail that is positioned forward of and oriented substantially parallel to an aftward seal rail;

wherein each of the seal rails extends along a second axis corresponding a circumferential direction to define a respective length;

wherein each of the seal rails extends along a third axis, relative to the length, to define a narrow thickness in an axial direction;

wherein each of the seal rails comprises:

opposing and substantially planar rail faces, including a forward rail face and an aftward rail face, the narrow thickness being defined along a periphery of each seal rail by rail edges that span between each forward rail face and each corresponding aftward rail face;

a cutter tooth having a circumferential length coinciding with a cutter tooth section disposed on each seal rail, the cutter tooth section of each seal rail comprising a circumferential section of each seal rail that is axially thickened relative to the narrow thickness of each seal rail;

opposing rotationally leading and rotationally trailing rail edges, the rotationally leading rail edge leading the rotationally trailing edge during operation, given the rotation direction of the rotor blade when installed in the turbine;

a rotationally leading section that extends from the cutter tooth section to a rotationally leading rail edge; and a rotationally trailing section that extends from the cutter tooth section to a rotationally trailing rail edge;

wherein the forward seal rail comprises a substantially constant height across the cutter tooth section, the rotationally leading section, and the rotationally trailing section; and wherein the aftward seal rail comprises a leakage gap configured for increasing a leakage level during operation of the turbine in which the rotor blade is installed; the leakage gap comprising at least one of:

the height of the aftward seal rail within the rotationally leading section being appreciably reduced compared to a constant height that the aftward seal rail comprises across both the rotationally trailing section and the cutter tooth section; and the height of the aftward seal rail within the rotationally trailing section being appreciably reduced compared to a substantially constant height that the aftward seal rail comprises across both the rotationally leading section and the cutter tooth section.

13. A rotor blade for a turbine of a gas turbine, the rotor blade comprising:
an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
a tip shroud attached to the outboard tip of the airfoil, the tip shroud comprising: an axially and circumferentially extending planar component in which an inboard surface opposes an outboard surface; and a shroud edge that connects the inboard surface to the outboard surface and defines an outboard profile of the tip shroud;
seal rails protruding from the outboard surface of the tip shroud along a first axis corresponding to a radial direction to define a respective height, the seal rails including a forward seal rail that is positioned forward of and oriented substantially parallel to an aftward seal rail;
wherein each of the seal rails extends along a second axis corresponding a circumferential direction to define a respective length;
wherein each of the seal rails extends along a third axis, relative to the length, to define a narrow thickness in an axial direction;
wherein each of the seal rails comprises:
opposing and substantially planar rail faces, including a forward rail face and an aftward rail face, the narrow thickness being defined along a periphery of each seal rail by rail edges that span between each forward rail face and each corresponding aftward rail face;
a cutter tooth having a circumferential length coinciding with a cutter tooth section disposed on each seal rail, the cutter tooth section of each seal rail comprising a circumferential section of each seal rail that is axially thickened relative to the narrow thickness of each seal rail;
opposing rotationally leading and rotationally trailing rail edges, the rotationally leading rail edge leading the rotationally trailing edge during operation, given the rotation direction of the rotor blade when installed in the turbine;
a rotationally leading section that extends from the cutter tooth section to a rotationally leading rail edge; and
a rotationally trailing section that extends from the cutter tooth section to a rotationally trailing rail edge;
wherein the aftward seal rail comprises a substantially constant height across the cutter tooth section, the rotationally leading section, and the rotationally trailing section; and
wherein the forward seal rail comprises a leakage gap, the leakage gap comprising at least one of:
the height of the forward seal rail within the rotationally leading section being appreciably reduced compared to a constant height that the forward seal rail comprises across one of or both the rotationally trailing section and the cutter tooth section; and
the height of the forward seal rail within the rotationally trailing section being appreciably reduced compared to a substantially constant height that the forward seal rail comprises across one of or both the rotationally leading section and the cutter tooth section.

14. A rotor blade for a turbine of a gas turbine, the rotor blade comprising:
an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
a tip shroud attached to the outboard tip of the airfoil, the tip shroud comprising: an axially and circumferentially extending planar component in which an inboard surface opposes an outboard surface; and a shroud edge that connects the inboard surface to the outboard surface and defines an outboard profile of the tip shroud;
seal rails protruding from the outboard surface of the tip shroud along a first axis corresponding to a radial direction to define a respective height, the seal rails including a forward seal rail that is positioned forward of and oriented substantially parallel to an aftward seal rail;
wherein each of the seal rails extends along a second axis corresponding a circumferential direction to define a respective length;
wherein each of the seal rails extends along a third axis, relative to the length, to define a narrow thickness in an axial direction;
wherein each of the seal rails comprises:
opposing and substantially planar rail faces, including a forward rail face and an aftward rail face, the narrow thickness being defined along a periphery of each seal rail by rail edges that span between each forward rail face and each corresponding aftward rail face;
a cutter tooth having a circumferential length coinciding with a cutter tooth section disposed on each seal rail, the cutter tooth section of each seal rail comprising a circumferential section of each seal rail that is axially thickened relative to the narrow thickness of each seal rail;
opposing rotationally leading and rotationally trailing rail edges, the rotationally leading rail edge leading the rotationally trailing edge during operation, given the rotation direction of the rotor blade when installed in the turbine;
a rotationally leading section that extends from the cutter tooth section to the rotationally leading rail edge; and
a rotationally trailing section that extends from the cutter tooth section to the rotationally trailing rail edge;
wherein each of the forward seal rail and the aftward seal rail comprises the a leakage gap;
wherein the leakage gap of the forward seal rail comprises at least one of:
the height of the forward seal rail within the rotationally leading section being appreciably reduced compared to a constant height that the forward seal rail comprises across one of or both the rotationally trailing section and the cutter tooth section; and
the height of the forward seal rail within the rotationally trailing section being appreciably reduced compared to a substantially constant height that the forward seal rail comprises across one of or both the rotationally leading section and the cutter tooth section; and
wherein the leakage gap of the aftward seal rail comprises at least one of:

the height of the aftward seal rail within the rotationally leading section being appreciably reduced compared to a constant height that the aftward seal rail comprises across one of or both the rotationally trailing section and the cutter tooth section; and the height of the aftward seal rail within the rotationally trailing section being appreciably reduced compared to a substantially constant height that the aftward seal rail comprises across one of or both the rotationally leading section and the cutter tooth section.

\* \* \* \* \*